Figure 1:
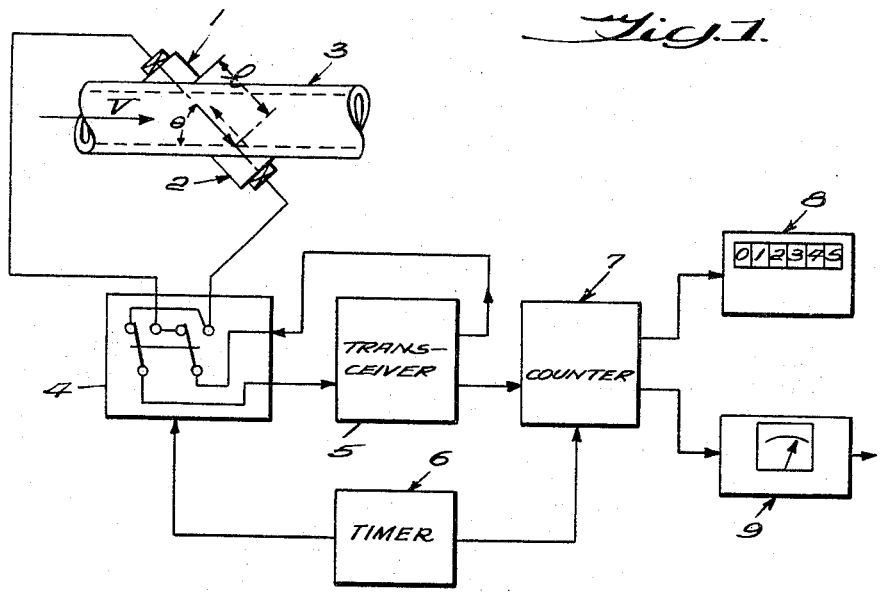

July 4, 1967    MIAKI YAMAMOTO ETAL    3,329,017
ULTRASONIC FLOW QUANTITY MEASURING APPARATUS
Filed April 29, 1964    3 Sheets-Sheet 1

INVENTORS
MIAKI YAMAMOTO,
YASUAKI ARAI,
TAKESHI ARAI,

BY Pierce, Schiffler & Parker their ATTORNEYS

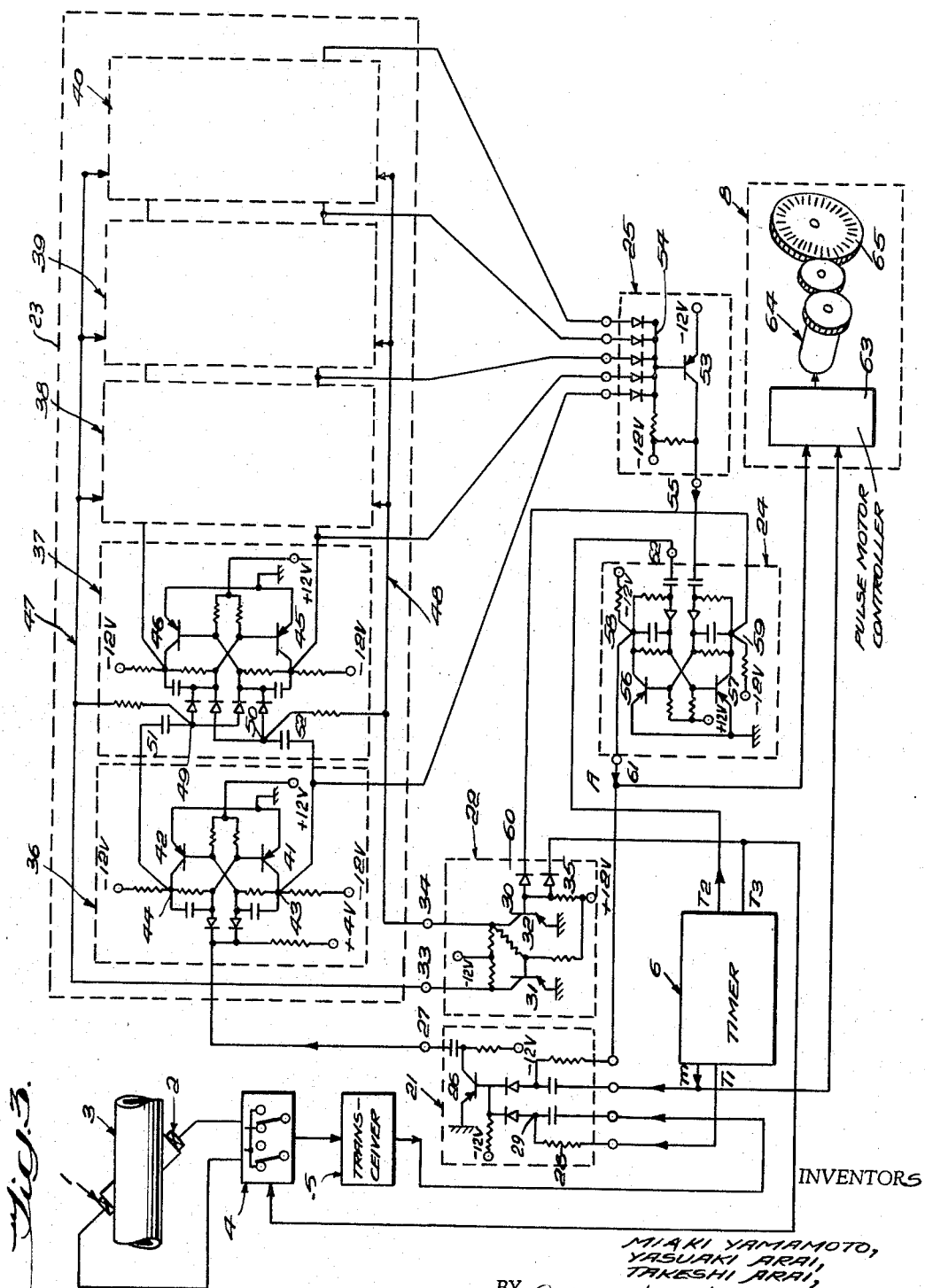

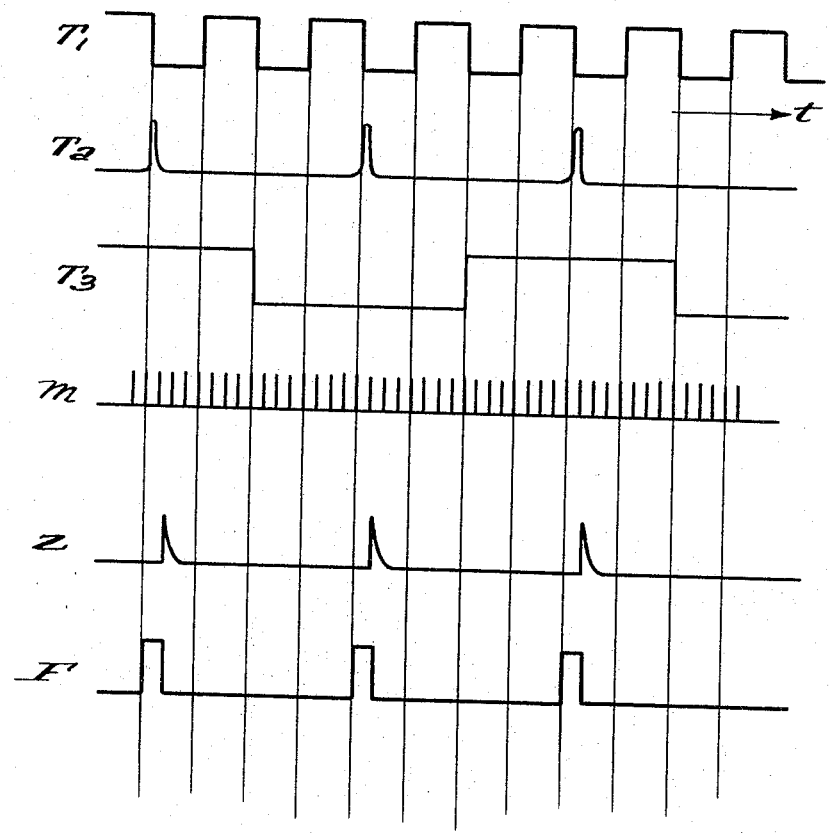

United States Patent Office 3,329,017
Patented July 4, 1967

3,329,017
ULTRASONIC FLOW QUANTITY MEASURING
APPARATUS
Miaki Yamamoto, Tokyo, Yasuaki Arai, Machida, Tokyo, and Takeshi Arai, Yokohama, Japan, assignors to Tokyo Keiki Seizosho Co. Ltd., Tokyo, Japan, a corporation
Filed Apr. 29, 1964, Ser. No. 363,503
Claims priority, application Japan, May 7, 1963, 38/22,687
2 Claims. (Cl. 73—194)

The present invention relates to electronic measuring apparatus, and is concerned with the provision of an apparatus for measuring a flow quantity by utilizing ultrasonic waves, and particularly to an ultrasonic flow quantity measuring apparatus of digital type wherein a sing-around loop is used and the direction of transmission and reception is periodically reversed. The meaning of "flow quantity" mentioned herein includes flow speed, and the apparatus of the invention is so constructed as to calculate the integrated value of flow speed during any predetermined period.

Heretofore, various types of flow quantity meters utilizing ultrasonic waves have been devised, among which a system utilizing sing-around loops is, in practice, very important. The reason is that utilization of sing-around loops, from its principle, makes it possible that any variation of acoustic velocity does not affect the measured value of flow speed, and also has the advantage that even for very slow speed a relatively accurate measurement is possible.

There are two types of sing-around methods. One of them is a system utilizing two sing-around loops, while the other is a system utilizing only one sing-around loop. Though each of those systems has its peculiar feature, the latter system, owing to its having only one sing-around loop, has no mutual interference between the sing-around loops as does the two loop type.

Further, owing to utilizing only one set of transducers and one transceiver, the measurement error can be reduced to a minimum, resulting in good accuracy of measurement. By taking a sufficiently long measuring time a relatively accurate measurement can be performed even in case of an extremely slow flow speed.

The flow measuring apparatus of the present invention is so constructed that, employing only one set of probes as mentioned above, the direction of transmission and reception of ultrasonic pulses is changed over for each predetermined period, namely, obliquely along the flow in one period, and obliquely against the flow in the other period, the difference between sing-around frequencies during the periods being counted in an electric counter the counted result of which is transferred to any desired indicator instrument during an idle period other than the counting periods. According to the present invention, two probes are adapted to be mounted (1) opposite each other and (2) obliquely with relation to the direction of the fluid flow being measured. To the probes there is connected a transceiver for transmitting and receiving ultrasonic electric pulses, this transceiver being so constructed that when an ultrasonic pulse which had been transmitted from one of the pair of probes is received at the other probe, the transceiver, upon receiving an ultrasonic electric pulse in response to the received ultrasonic pulse, transmits an ultrasonic electric pulse to said one of said probes. The apparatus includes means for periodically reversing the relation of transmission and reception of the two probes, and further includes an electrical additive and subtractive counting circuit. Means are provided for introducing into this counting circuit, during a predetermined sub-period within a repetitive period, ultrasonic electric pulses in response to ultrasonic pulses received in each of the two probes; and, further, means are provided for causing this counting circuit to count additively the number of electric pulses introduced from one of said probes and to count subtractively the number of electric pulses introduced from the other of said probes. The result counted by said counting circuit is caused by suitable transfer means to be transferred, during another sub-period, to a flow quantity indicator, this latter sub-period having a different duration than have the sub-periods in which pulses from the transceiver are introduced into the counting circuit.

Figure 2:
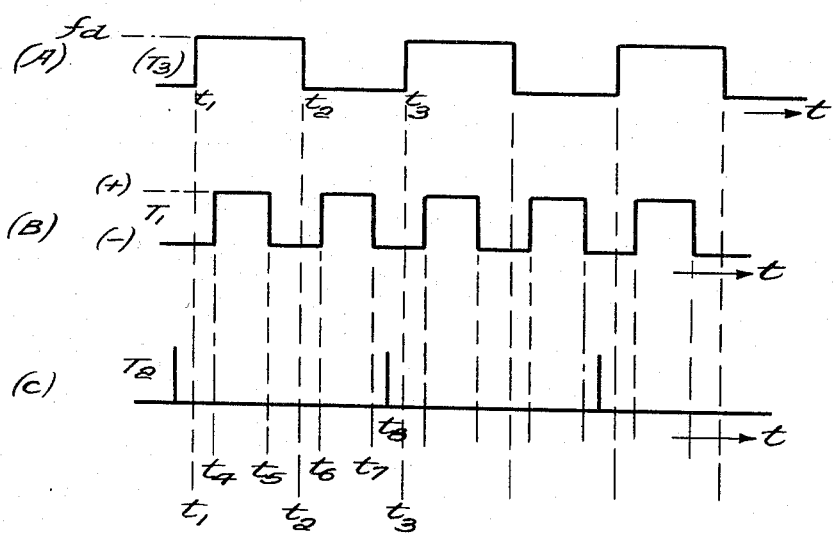

The invention will now be described in greater particularity and with reference to the accompanying drawing, in which:

FIG. 1 is a schematic block-type diagram showing the principle of the invention;

FIG. 2 consists in time diagrams of electric signals utilized in the apparatus of FIG. 1;

FIG. 3 is a detailed electrical connection diagram representing an embodiment of the invention; and FIG. 4 consists in time diagrams of electric signals utilized in the apparatus of FIG. 3.

One embodiment of the invention will be explained referring to FIG. 1 and FIG. 2. In FIG. 1, 1 and 2 are a set of probes, and 3 is a pipe through which flows a fluid. Probes 1 and 2 are mounted on, and with an angle $\theta$ obliquely to, the outside wall of pipe 3; 4 is a change-over switch; 5 is a transceiver; and 6 is a timer. The transceiver 5 transmits an electric pulse which is sent through switch 4 to probe 1 or 2, the mechanical ultrasonic pulse developed by one of said probes advances in pipe 3 along the flow, as shown by a solid line, or against the flow, as shown by a dotted line, and is received by the other of said probes. Then in transceiver 5, in response to and just after a received pulse, a next electric pulse is transmitted. Thus a set of sing-around loops is created. The change-over of transmission and reception by switch 4, the switching by which either one of probes 1 and 2 is made to transmit and the other is made to receive, is performed by a periodic signal from timer 6.

As shown in FIG. 1, when the flow speed in pipe 3 is V in the direction of arrow, the velocity of ultrasonic waves which advance along the flow in the direction of the solid line from probe 1 to probe 2 is somewhat larger than the velocity would be at zero flow speed, and on the contrary the velocity of ultrasonic waves which advance against the flow in the direction of the dotted line from probe 2 to probe 1 is somewhat smaller than the velocity would be at zero flow speed. Hence the frequency in the set of sing-around loops mentioned above also varies accordingly. Assuming the frequency along the flow is $fd$, and the frequency against the flow is $fu$, the following relations hold, wherein the acoustic velocity in the stationary fluid is assumed to be "C" and the length of ultrasonic advance passage in the liquid to be $l$.

$$fd = \frac{C + V \cos \theta}{l} k \tag{1}$$

$$fu = \frac{C - V \cos \theta}{l} k \tag{2}$$

In the above expressions, "$k$" is a constant determined from the construction of the probes, the material and dimensions of the pipe, etc. Hence, taking the difference between the two expressions:

$$\Delta f = fd - fu = \frac{2V \cos \theta}{l} k \tag{3}$$

FIG. 2(A) represents the periodic signal from timer 6 to switch 4. During a period from $t_1$ to $t_2$, since the signal from timer 6 to switch 4 is (+), probe 1 is a transmitter and probe 2 a receiver; therefore, the sing-around frequency is $fd$. Next, during a period from time $t_2$ to $t_3$, since the signal from timer 6 to switch 4 is (−), the transmission and reception of probes 1 and 2 is reversed; therefore, the sing-around frequency is $fu$. Thereafter, the same is repeated periodically.

In FIG. 1, a received pulse in transceiver 5, after being amplified, causes a transmitting pulse to be emitted to switch 4 as mentioned above, and simultaneously also causes a pulse to be emitted to an additive and subtractive counter 7. To the counter there also are transmitted control signals from timer 6.

FIG. 2(B) represents one of the control signals $T_1$ from timer 6 to the counter 7. This signal $T_1$ is (+) from time $t_4$ to $t_5$, (−) from $t_5$ to $t_6$, (+) from $t_6$ to $t_7$, and thereafter the same is repeated. The counter 7 is so constructed that only when signal $T_1$ is (+) does it perform counting operations for input pulses from transceiver 5. From timer 6 to counter 7 there also is sent a signal $T_3$ of the same shape as shown in FIG. 2(A), and the counter 7 counts additively the number of pulses from transceiver 5 when the signal $T_3$ is (+) and counts subtractively when the signal $T_3$ is (−). Hence, after time $t_7$, a number of pulses proportional to $(fd-fu)$ mentioned above is stored in the counter 7 and thereafter for a while the same condition continues.

Next, at time $t_8$, another signal is given from timer 6 to counter 7, namely, a pulse signal $T_2$ as shown in FIG. 2(C). The counter 7, in response to the signal $T_2$, starts its clearing operation which is in this case a subtractive operation. When the counter 7 performs a subtractive operation, the number stored therein is decreased successively, and when it reaches zero, the calculating operation is terminated automatically, whereupon the sending of pulses to indicator 8 is also stopped. Hence it results that the number of pulses stored in counter 7 has been transferred to indicator 8 with the result that the indicator 8 indicates an integrated flow quantity. In addition, an instantaneous flow quantity indicator 9 may be provided which is also supplied with pulses from counter 7.

In FIG. 2, the interval from time $t_1$ to $t_3$ forms one cycle of operation, and thereafter the same cycle is repeated successively. In the above description, it is necessary that the time length from time $t_4$ to $t_5$ be exactly equal to the time length from $t_6$ to $t_7$.

The embodiment described above is so arranged that, in a cycle of counting operation, sequential the counting when the ultrasonic pulses in pipe 3 are along the flow and the counting when they are against the flow always has the same sequence. Namely, of $fd-fu$, $fd$ is always formerly counted and afterward $fu$ is counted. According to this counting system, when the acoustic velocity is varied slowly in one direction either increasingly or decreasingly due to temperature change or change of composition of the liquid to be measured, even a small error due to the variation is accumulated in progression of time until at last a relatively large error might appear. Further, when the above stated variation of acoustic velocity occurs relatively speedily in one direction, a relatively large error might be produced in a relatively short time. Another embodiment of the invention, in order to remove this defect, is so constructed that the sequence of the two counting operations is periodically reversed, whereby the sign, positive and negative, of the error is also reversed, with the result that the error due to variation of the acoustic velocity can be almost completely eliminated. Such embodiment invention is described hereinafter.

In FIG. 3, which shows the detailed electrical connection of another embodiment of the present invention, the timer 6 emits three signals $T_1$ $T_2$ and $T_3$ mentioned above as well as a counting pulse signal $m$. These signals sequential are shown in FIG. 4. The signal $T_3$ is (+) from before time 11 to time 13; is (−) from time 13 to 17; and (+) from time 17 to after time 19.

The period between times 11 and 12 and that between 12 and 13, etc. are of the order of about one second, while the signal $m$ is a series of pulses of the order of about 20 cycles per second. In practice a crystal oscillator is utilized for generation of signal $T_1$ and the other signals $T_2$, $T_3$, etc. are generated on the basis of it.

Again referring to FIG. 3, 21 is a preamplifier device; 22 is an additive and subtractive control device; 23 is an additive and subtractive counter; 24 is an integral control device; and 25 is a zero inspector device. The output pulses of transceiver 5 are introduced into one of the input terminals of preamplifier device 21, and hereinunder the pulses are assumed to be (+). Normally, since transistor 26 in preamplifier device 21 is conducting, its collector potential is earth, and when a (+) pulse, above mentioned, is introduced, its base potential being suddenly raised, the transistor 26 is suddenly shut off, and hence its collector potential drops suddenly to near −12 v., thereby the potential of an output terminal 27 also drops suddenly. Since this potential drop is introduced into an input terminal of counter 23, this counter receives a number of (−) pulses equal to the number of output pulses of transceiver 5. Now, since the signal $T_1$ (FIG. 4) of timer 6 is applied through a resistor 28 to a point 29 on the input circuit mentioned above, if this signal $T_1$ is (+), the above mentioned operation in amplifier device 21 is performed without any objection. However, if signal $T_1$ is (−), the potential of point 29 remains negative, even when (+) output pulses of transceiver 5 come in. Thus, the output pulses of transceiver 5 cause the counter 23 to be operated only during the period when signal $T_1$ is (+).

A transistor 32 in the additive and subtractive control device 22, its base being normally at earth potential (as described hereinunder), does not conduct, and transistor 31, its base being at a negative potential, conducts. In this condition, an output terminal 33 of control device 22 is at earth potential and an output terminal 34 is at a negative potential. The counter 23 is so constructed that in this condition it performs an additive operation. The output signal $T_3$ of timer 6 is applied through a rectifier 35 to a point 30, namely, to the base of transitsor 32. If this signal $T_3$ (FIG. 4) is (+) (assuming now that the other input line including a rectifier 60 does not exist), the above stated condition of transistor 32 shut-off is held, but if the signal $T_3$ is (−), the transistor 32 conducts and the other transistor 31, its base potential becoming positive, is shut off. In the latter condition, the output terminal 33 acquires a negative potential and the output terminal 34 becomes zero potential. In this condition the counter 23 is constructed to perform a subtractive operation. Further, when another signal applied to point 30, namely, a signal derived from the integral control device 24 is reversed from positive to negative, a similar change-over operation from additive to subtractive is performed.

The additive and subtractive counter 23 comprises five counter elements 36 to 40 inclusive, each of which is composed of a flip-flop circuit including two transistors and hence is a counter of the binary type represented by (0) and (1). Speaking about the counter element 36, normally a transistor 41 is shut off while a transistor 42 is conducting, and this condition represents (0) of the binary. In this condition, a point 43 is at a negative potential near −12 v., while a point 44 is at about earth potential. Similarly about a counter element 37, normally a transistor 45 is shut off while a transistor 46 is conducting, thus being in (0) condition, and about the other counter elements 38 to 40 inclusive, the condition is the same. Now when a negative pulse from the output terminal 27 of preamplifier device 21 is applied to the input terminal of counter element 36, this flip-flop circuit is reversed. Namely the transistor 41 becomes conducting while the transistor 42 becomes shut off when the potential of point 43 rises suddenly to zero potential while the potential of point 44 drops suddenly to a negative potential. This reversed condition represents (1) of the binary. The change of potential of points 43 and 44, due to this change-over operation, is conveyed to two input terminals of the counter element 37.

When the output terminal 33 of additive and subtractive control device 22 is at earth or zero potential and the output terminal 34 is at a negative potential, the line 47 is at zero potential while the line 48 is at a negative potential, and hence a point 49 is at zero potential while the point 50 is at a negative potential. Since on the other hand the point 44 is at zero potential while the point 43 is at a negative potential, condensers 51 and 52 both are not substantially charged. Therefore, even when the potential of point 43 rises, due to the above mentioned change-over of potential, the potential of point 50, only rising to near zero potential, does not change sufficiently to cause the condition of counter element 37 to be changed-over. When the counter element 36 is changed-over and the state is attained in which the point 43 is at zero potential while the point 44 is at a negative potential, the condenser 51 is sufficiently charged positive at lower and negative at upper, and therefore when the counter element 36 is next changed over from (1) condition to (0) condition, the potential of point 49 becomes sufficiently positive to raise the base potentials of transistors 45 and 46 to a sufficiently positive value, thereby to change-over the condition of counter element 37 from (0) to (1). The relation between counter element 37 and counter element 38 is similar.

The counter 23 is assumed to represent a number 0 when all of its counter elements 36 to 40 inclusive are in (0) condition. If the condition in which its input terminal has been supplied with one pulse represents a number 1 and the condition in which it has been supplied with two pulses represents a number 2 and so forth, the counter 23 can represent numbers equal to two to the fifth power. Of course, by increasing the number of counter elements, the number which it can count can be increased as desired. If the output terminal 33 of additive and subtractive control device 22 is at a negative potential and the output terminal 34 is at zero potential, the situation is reversed, namely, when the counter element 36 is changed over from (0) to (1) the condition of counter element 37 is reversed. This relation similarly holds between each adjacent two of the remaining counter elements 37 to 40 inclusive. In this case, therefore, the result is that the counter 23 performs a subtractive operation for each arrival of a pulse at its input terminal.

The zero inspector device 25 performs an operation of detecting that the counter 23 is in a condition representing a number 0. When the counter 23 is in this condition, the point 43 in counter element 36 and corresponding points in the other counter elements 37 to 40 inclusive are all at negative potential, and when the counter 23 is in any other condition at least one of point 43 and corresponding points is at zero potential. In order to discriminate these, there is provided a transistor 53 the emitter of which is given −2 v. If there is zero potential at any one of point 43 and, corresponding points the potential of point 54 becomes zero, therefore the transistor 53 does not conduct and hence the potential of output terminal 55 is negative −12 v. If the counter 23 is suddenly changed from this condition to the condition representing a number 0, point 43 and corresponding points all become negative; therefore, the potential of point 54 drop toward −12 v., whereby the transistor 53 conducts so as to raise the potential of output terminal 55 suddenly to −2 v. This pulse, namely Z pulses in FIG. 4, is applied to integral control device 24.

The integral control device 24 comprises a flip-flop circuit including a pair of transistors 56 and 57. Normally, it is in a condition that the transistor 56 is shut off while the transistor 57 is conducting whereby a point 58 is at a negative potential near −12 v., while a point 59 is at zero potential. The point 59 is led to additive and subtractive control device 22 as mentioned above, and connected through rectifier 60 to point 30. Hence, when the point 59 is at zero potential it does not prevent the additive control of control device 22, but when the point 59 is at negative potential the control device becomes subtractive controlling. The point 58 is connected through output terminal 61 to one input terminal of preamplifier device 21. To another input terminal of preamplifier device 21 there are sent continuously "m" pulses from timer 6. These "m" pulses, similarly as in the above mentioned relation between input pulses from transceiver 5 and signal $T_1$ from timer 6, cause no change in the internal condition of preamplifier device 21 when the potential at terminal 61 namely signal F in FIG. 4 is at negative potential. Only when signal F is at zero potential, (−) pulses are generated at output terminal 27 synchronous with "m" pulses.

An input terminal 62 of integral control device 24 is supplied with output pulses $T_2$ of timer 6. When a positive pulse $T_2$ is supplied in the condition that the transistor 57 is conducting, its base potential is raised and this transistor 57 is shut off; thus, the condition of control device 24 is reversed whereby the point 58 becomes zero potential while the point 59 becomes negative potential. In this condition, when a positive pulse arrives at another input terminal from terminal 55, the base potential of transistor 56 is raised, thereby the control device 24 is again reversed to return back to its former condition. Signal F at output terminal 61 is supplied also to a flow quantity indicator 8.

Still referring to FIG. 3, the flow quantity indicator 8 comprises a pulse motor controller 63, a pulse motor 64 and an indicator element 65. The controller 63 is supplied with signal F from integral control device 24 as well as "m" pulses from timer 6, and the pulse motor 64 is so controlled that it advances one step for each "m" pulse only when signal F is at zero potential. The indicator element 65 is successively rotated one step in response to each step of pulse motor 64 to indicate the integrated value of flow quantity.

In FIG. 4, considering first the condition just before time 12, since the signal $T_3$ is (+) the switch 4 in FIG. 3 supplies pulses of ultrasonic sing-around frequency $fd$ along the flow of transceiver 5, and makes the additive and subtractive control device 22 perform an additive control. At this time, though the output pulses of transceiver 5 and "m" pulses of timer 6 both are supplied to preamplifer device 21, since the signal $T_1$ is negative and the signal F is also negative, preamplifier device 21 is not operated. Accordingly, the counter 23 also is not operated. Next, during a period from 12 to 13, since the signal $T_1$ is positive, it causes preamplifier device 21 to be operated synchronously with the output pulses of transceiver 5, whereby during this period the counter 23 counts additively the number of these pulses. During a next period from time 13 to time 14, since the signal $T_1$ is negative, this period becomes an idle time, and since the signal $T_3$ becomes negative here, it causes the switch 4 to be changed over toward pulses of frequency $fu$ against the flow and cause the control device 22 through rectifier 35 to be changed over toward subtractive control. Then during an operational period from time 14 to 15, when the signal $T_1$ is positive, the preamplifier device 21 is operated synchronously with $fu$ output pulses of transceiver 5; accordingly, the counter 23 counts substractively the nummer of those pulses. Therefore, the result is that just after time 15 a number corresponding to $fd-fu$ is stored in counter 23.

Though a next period from time 15 to 16 is an idle time, when the pulse $T_2$ is emitted just after time 15 this pulse is introduced through input terminal 62 into integral control device 24 to reverse its condition, whereby the signal F at output terminal 61 is raised from negative to zero potential. At the same time, though the potential of point 59 drops, since the signal $T_3$ is at this time already negative, the control device 22 is given no change. When signal F is raised to zero potential, the preamplifier device 21 is operated synchronously with "m" pulses, whereby the counter 23 decreases successively its stored number. At the same time, signal F causes pulse motor controller 63 to be operated, whereby the pulse motor 64 is advanced step by step in response to the number of "$m$" pulses which arrive there. When the number in counter 23 after being successively decreased attains zero, the zero inspector device 25 is operated to generate a Z pulse at its output terminal 55, which pulse is supplied to integral control device 24 to reverse it again to its previous state. Then the signal F is reset to negative, whereby the operation of preamplifier device 21, counter 23 and pulse motor controller 63 are stopped.

During a next period from time 16 to 17, since the signal $T_3$ is negative, when the preamplifier device 21 is operated the counter 23 subtractively counts pulses of frequency $fu$ against the flow. Though a next period from time 17 to 18 is an idle time, since the signal $T_3$ is changed from negative to positive, it causes switch 4 to be changed over so as to transmit pulses of frequency $fd$ along the flow to amplifier device 21 and simultaneously causes control device 22 to be changed over to an additive control. Then during an operational period from time 18 to 19, the counter 23 synchronously with the operation of preamplifier device 21 additively counts pulses of frequency $fd$ along the flow. Therefore, the result is that just after time 19 the counter 23, similarly as before, stores the number corresponding to $fd-fu$. Just after time 19, when the pulse $T_2$ is emitted, the integral control device 24 is reversed to raise signal F to zero potential and to drop the potential of point 59. This potential drop causes the control device 22, which until then has been additive controlling by the positive potential of signal $T_3$, to be changed over to subtractive controlling. Therefore, by potential rise of signal F, similarly as before, the counter 23 is restored toward a number 0 while the pulse motor 64 is advanced step by step by the number stored in the counter 23, and at its completion a pulse Z is emitted as output terminal 55 of zero inspector device 25 to reset the integral control device 24 to its original state.

It will be obvious, from the above description, that the apparatus shown in FIG. 3 completes one cycle of operation during the period from time 12 to 20 shown in FIG. 4. During the first half cycle, namely, from time 12 to time 16, first the number of pulses of frequency $fd$ along the flow is counted; thereafter, the number of pulses of frequency $fu$ against the flow is counted and the difference between them is obtained. On the contrary, during the latter half cycle, namely, from time 16 to 20, first the number of pulses of frequency $fu$ against the flow is counted, thereafter the number of pulses of frequency $fd$ along the flow is counted, and the difference between them is obtained. As above state, by periodically reversing the sequential order of the two countings, errors due to sequential variation of acoustic velocity and the like cancel each other, so as to make possible an accurate measurement of flow quantity.

According to the invention, by periodically reversing the sequential order of the counting of pulses along the flow and the counting of pulses against the flow, an advantage is obtained that very accurate measurements of flow quantity can be performed.

We claim:
1. An ultrasonic flow quantity measuring apparatus comprising a pair of probes adapted to be mounted opposite to each other and obliquely relative to the direction of a fluid flow to be measured; a device for transmitting and receiving ultrasonic electric pulses connected to said probes and so constructed that when an ultrasonic pulse transmitted from one of said probes is received at the other of said probes said device upon receiving an ultrasonic electric pulse in response to the received ultrasonic pulse transmits an ultrasonic electric pulse to said one of said probes; means for periodically reversing the relation of transmission and reception of said pair of probes; an electronic additive and subtractive counting circuit; means for introducing ultrasonic electric pulses in response to ultrasonic pulses received in one and the other of said probes into said counting circuit during a predetermined subperiod or subperiods and another predetermined subperiod or subperiods, respectively, of precisely equal time length with each other, within a repeated cycle; means for causing said counting circuit to count additively the number of electric pulses introduced from one of said probes and to count substractively the number of electric pulses introduced from the other of said probes; a flow quantity indicator; and means for transferring the result counted by said counting circuit to said indicator in a subperiod or subperiods within said repeated cycle other than said introducing and counting subperiods.

2. An ultrasonic flow quantity measuring apparatus as defined in claim 1, including means for periodically reversing the sequential order of said pulses introduced into said electrical additive and subtractive counting circuit from one of said probes and from the other of said probes during said counting subperiods of each successive period.

No references cited.

RICHARD C. QUEISSER, *Primary Examiner.*

C. A. RUEHL, L. R. FRANKLIN, *Examiners.*